(12) United States Patent
Grothe et al.

(10) Patent No.: US 10,795,570 B2
(45) Date of Patent: Oct. 6, 2020

(54) DEVICE AND SYSTEM HAVING A USER INTERFACE FOR EMERGENCY COMMUNICATIONS

(71) Applicant: Prepare Protect Defend, LLC, Parker, CO (US)

(72) Inventors: Ryan Grothe, Parker, CO (US); Brett Titus, Parker, CO (US)

(73) Assignee: PREPARE PROTECT DEFEND, LLC, Parker, CO (US)

( * ) Notice: Subject to any disclaimer, the term of this patent is extended or adjusted under 35 U.S.C. 154(b) by 153 days.

(21) Appl. No.: 15/600,614

(22) Filed: May 19, 2017

(65) Prior Publication Data

US 2017/0336967 A1    Nov. 23, 2017

Related U.S. Application Data

(60) Provisional application No. 62/423,678, filed on Nov. 17, 2016, provisional application No. 62/340,430, filed on May 23, 2016.

(51) Int. Cl.

| | |
|---|---|
| *G06F 3/0488* | (2013.01) |
| *H04W 4/021* | (2018.01) |
| *H04W 76/50* | (2018.01) |
| *G01S 19/17* | (2010.01) |
| *G08B 25/01* | (2006.01) |
| *G06F 3/0484* | (2013.01) |
| *G06F 3/0482* | (2013.01) |

(52) U.S. Cl.
CPC ......... *G06F 3/04883* (2013.01); *G01S 19/17* (2013.01); *G06F 3/0482* (2013.01); *G06F 3/04842* (2013.01); *G06F 3/04886* (2013.01); *G08B 25/016* (2013.01); *H04W 4/022* (2013.01); *H04W 76/50* (2018.02); *G01S 2205/006* (2013.01)

(58) Field of Classification Search
CPC ............ G06F 3/04883; G06F 3/04886; G06F 3/0482; G06F 3/04842; H04W 76/50; H04W 4/022; G01S 2205/006; G01S 19/17; G08B 25/016
See application file for complete search history.

(56) References Cited

U.S. PATENT DOCUMENTS

| | | | | |
|---|---|---|---|---|
| 8,624,727 | B2 * | 1/2014 | Saigh ................... | A61K 9/08 340/539.13 |
| 9,426,638 | B1 * | 8/2016 | Johnson ............... | H04W 4/90 |
| 9,769,639 | B2 * | 9/2017 | Cole, Jr. .............. | H04W 4/02 |
| 2008/0070546 | A1 * | 3/2008 | Lee ...................... | H04W 4/90 455/404.2 |
| 2008/0139165 | A1 * | 6/2008 | Gage ................... | H04W 4/90 455/404.1 |

(Continued)

OTHER PUBLICATIONS

Lifesaving technology in the palm of your hand, Prepare Protect Defend, LLC, Oct. 2016, 2 pages.

*Primary Examiner* — Kieu D Vu
*Assistant Examiner* — Rami R Okasha
(74) *Attorney, Agent, or Firm* — Brownstein Hyatt Farber Schreck, LLP

(57) ABSTRACT

The disclosure is directed toward a communication system having a mobile device using a gesture-based user interface. The mobile device may include a user interface that is configured to accept gesture-based commands from a user and relay important information to a responder server during emergency situations.

19 Claims, 15 Drawing Sheets

(56) References Cited

U.S. PATENT DOCUMENTS

| | | | | |
|---|---|---|---|---|
| 2009/0249247 A1* | 10/2009 | Tseng | | H04M 1/72552 |
| | | | | 715/808 |
| 2011/0136463 A1* | 6/2011 | Ebdon | | G01C 21/20 |
| | | | | 455/404.1 |
| 2012/0282886 A1* | 11/2012 | Amis | | H04M 1/72541 |
| | | | | 455/404.2 |
| 2013/0065569 A1* | 3/2013 | Leipzig | | G06F 9/453 |
| | | | | 455/416 |
| 2013/0102281 A1* | 4/2013 | Kanda | | G06F 21/36 |
| | | | | 455/410 |
| 2014/0218537 A1* | 8/2014 | Nepo | | G08B 15/004 |
| | | | | 348/158 |
| 2015/0032455 A1* | 1/2015 | Gazdzinski | | G06Q 30/0251 |
| | | | | 704/270 |
| 2015/0111524 A1* | 4/2015 | South | | H04W 4/90 |
| | | | | 455/404.2 |
| 2015/0195676 A1* | 7/2015 | Endress | | H04L 67/306 |
| | | | | 455/404.2 |
| 2015/0242117 A1* | 8/2015 | Nakashima | | G06F 3/04883 |
| | | | | 715/773 |
| 2015/0317809 A1* | 11/2015 | Chellappan | | H04W 4/90 |
| | | | | 455/404.1 |
| 2015/0350858 A1* | 12/2015 | Reitnour | | H04W 4/90 |
| | | | | 455/404.2 |
| 2015/0358796 A1* | 12/2015 | Sarna, II | | H04W 4/90 |
| | | | | 455/404.2 |
| 2016/0050037 A1* | 2/2016 | Webb | | H04W 4/90 |
| | | | | 455/3.01 |
| 2016/0057595 A1* | 2/2016 | Ahmed | | H04W 4/90 |
| | | | | 455/404.1 |
| 2016/0092099 A1* | 3/2016 | Wellhofer | | A61B 3/0033 |
| | | | | 715/863 |
| 2016/0192163 A1* | 6/2016 | Miner | | H04W 4/90 |
| | | | | 455/404.1 |
| 2016/0353266 A1* | 12/2016 | Winkler | | H04W 4/90 |
| 2016/0379479 A1* | 12/2016 | Nepo | | G08B 25/016 |
| | | | | 340/539.13 |
| 2017/0006449 A1* | 1/2017 | Igumnov | | H04W 4/029 |
| 2017/0094474 A1* | 3/2017 | Hernoud | | H04W 4/029 |
| 2017/0109011 A1* | 4/2017 | Jiang | | G06F 1/1694 |
| 2017/0220746 A1* | 8/2017 | Marshall | | G06F 17/30 |
| 2017/0245130 A1* | 8/2017 | Mehta | | H04W 12/06 |

\* cited by examiner

DEVICE AND SYSTEM HAVING A USER INTERFACE FOR EMERGENCY COMMUNICATIONS

CROSS-REFERENCE TO RELATED APPLICATIONS

This application claims the benefit under 35 U.S.C. § 119(e) of U.S. Provisional Patent Application No. 62/423,678, filed on Nov. 17, 2016, and entitled "Device and System Having a User Interface for Emergency Communications" and U.S. Provisional Patent Application No. 62/340,430, filed on May 23, 2016, and entitled "Device and System Having a User Interface for Emergency Communications," the contents of each of which are incorporated by reference as if fully disclosed.

FIELD

The described embodiments relate generally to a device and system for facilitating emergency communication and, more specifically, to a mobile device having a user interface configured to relay information in emergency situations using gesture-based input.

BACKGROUND

In recent years, mobile devices and mobile communication systems have vastly improved the ability to communicate. Mobile devices, particularly mobile phones, have played an increasingly important role in communications during emergency situations. With extensive mobile service coverage and the ability to transmit large amounts of data over existing wireless networks, mobile phones can be an effective emergency communication tool, particularly when a user may not be able to use traditional land-line telephone equipment. However, in order to provide a broad range of functionality, many mobile devices implement increasingly complex user interfaces. In some instances, it may be difficult for a user to relay key information quickly using a complex interface, particularly if the user is distracted or under duress. Therefore, there is a use and a need for systems and devices having a user interface that is configured to readily relay important information from a user in an emergency situation.

SUMMARY

Some example embodiments are directed to a mobile device having a gesture-based user interface. The mobile device may include a user interface that is configured to accept simple commands from a user and relay key information during emergency situations. The commands and information may be relayed to third-party responders that can facilitate communication with the authorities or other rescue personnel. Some example embodiments are also directed to distributed alert systems that are configured to pass selected communications to users that are subscribers to an alert communication service, but may be located away from or outside of a geo-fenced region associated with an active incident.

Some example embodiments are directed to a mobile device having a display and a touch sensor configured to detect gesture input. The mobile device may be configured to display an initiate-alert region on the display. In response to receiving a first gesture input while the initiate-alert region is displayed, the mobile device may initiate an alert communication interface, which may be operable to contact authorities or an emergency responder service. The mobile device may also display a bifurcated status region on the display, the bifurcated status region indicating a first user status option and a second user status option. In response to receiving a second gesture input, the mobile device may initiate a status communication associated with the first user status option. In response to receiving a third gesture input, the mobile device may initiate a status communication associated with the second user status option.

In some embodiments, the first gesture is a vertical swipe gesture over the initiate-alert region. Touch input other than a vertical swipe gesture does not initiate an alert communication interface. The second gesture may be a horizontal swipe gesture toward a first area associated with the first user status option and the third gesture may be a horizontal swipe gesture toward a second area associated with the second user status option. Touch input other than a horizontal swipe gesture in the bifurcated status region does not initiate a communication to the responder server.

In some embodiments, the mobile device is further configured to determine a location of the mobile device and determine if the location is within a predefined geo-fence. In accordance with a determination that the location is within the geo-fence, the mobile device may be configured to initiate the alert communication interface in response to receiving the first gesture. In accordance with a determination that the location is not within the geo-fence, the mobile device may prohibit or suppress an initiation of the alert communication interface in response to receiving the first gesture.

Some example embodiments are directed to a mobile device having a global positioning system configured to determine location information using a wireless communication network. The device may also include a display for displaying a user interface and a touch sensor incorporated with the display and configured to detect touch input for the user interface. The mobile device may also include internal memory configured to store computer-readable instructions and a processor configured to execute the computer-readable instructions. The instructions may provide various functionality including displaying an initiate-alert icon on the display. In response to receiving a swipe-gesture input over the initiate-alert icon, the mobile device may initiate an alert communication interface, which may be operable to contact authorities or an emergency responder service (e.g., 9-1-1). The interface may be used to automatically communicate a location of the user to the authorities or an emergency responder service. The instructions may also include instructions for displaying a bifurcated status region on the display, the bifurcated status region indicating a first user status option at a first end and a second user status option at a second end. In response to receiving a first swipe-gesture input directed toward the first end, the mobile device may initiate a status communication associated with the first user status option. In response to receiving a second swipe-gesture input directed toward the second end, the mobile device may initiate a status communication associated with the second user status option. In some embodiments, the first user status option is to stay, indicating that a user intends to remain in one location, and the second user status option is to move, indicating that the user intends to change location.

In some embodiments, the instructions further comprise instructions for displaying an update status region on the display. The update status region may include the first user status option in a first area and the second user status option in a second area. In response to an additional swipe-gesture input being directed toward the first area, the mobile device may initiate an updated status communication associated with the first user status option. In response to the additional swipe-gesture input being directed across the second area, the mobile device may initiate an updated status communication associated with the second user status option.

In some embodiments, the instructions further comprise instructions for: determining a current user status; displaying a maintain current status icon in a first region using the display; and displaying a change status icon in a second region using the display. In response to an additional swipe-gesture input over the first region, the mobile device may initiate a maintain status communication. In response to an additional swipe-gesture input toward the second region, the mobile device may initiate a change status communication.

In some embodiments, the instructions further comprise instructions for displaying an injury icon on the display. In response to receiving a touch input on the injury icon, the mobile device may initiate an injury report communication to the responder server. In some implementations, the mobile device is configured to notify police authorities using the alert communication interface.

In some embodiments, the instructions further comprise instructions for defining a geo-fence based on the location information obtained using the global positioning system, and displaying a map associated with the geo-fence adjacent to the bifurcated status region.

In some embodiments, the instructions further comprise instructions for displaying an update status region on the display and displaying a scrolling message in a region adjacent to the update status region. In some cases, the scrolling message includes instructions for the user.

Some example embodiments are directed to a portable electronic device having a display and a touch sensor configured to detect gesture input. The portable electronic device may also include a memory configured to store computer-readable instructions. The portable electronic device may be configured to execute the computer-readable instructions for displaying an initiate-alert region on the display. In response to receiving a swipe-gesture input while the initiate-alert region is displayed, the portable electronic device may initiate an alert communication interface. The alert communication interface may be used to place a telephone call to authorities or an emergency responder service and broadcast location information automatically to the authorities or the service. In some instances, the portable electronic device displays a bifurcated status region on the display, the bifurcated status region indicating a first user status option and a second user status option. In response to receiving a first swipe-gesture input in a first direction, the portable electronic device may initiate a status communication associated with the first user status option. In response to receiving a second swipe-gesture input in a second direction, the portable electronic device may initiate a status communication associated with the second user status option. In some implementations, the first user status option is to maintain a current location, and the second user status option is to change a current location.

In some embodiments, the portable electronic device is configured to display a first user interface screen in response to a user selection of the first user status option, and display a second user interface screen in response to a user selection of the second user status option.

In some embodiments, the portable electronic device is further configured to: display a number pad on the display; receive a touch input on the number pad indicating a floor number of a building; and communicate the floor number to the responder server in response to the touch input.

Some example embodiments are directed to an emergency communication system comprising a group of subscriber mobile devices and a responder server. The group of subscriber mobile devices may be configured to communicate using a wireless network. Each subscriber mobile device may include a global positioning system configured to determine location information. The subscriber mobile devices may also include a touch-sensitive display and a processor configured to execute various functions in accordance with the following. For example, the subscriber mobile devices may communicate the location information to a responder server in response to an initiated alert. The subscriber mobile devices may also display a bifurcated status region on the display. In response to receiving a first swipe-based gesture over the bifurcated status region, the subscriber mobile devices may communicate a first status to the responder server. In response to receiving a second swipe-based gesture over the bifurcated status region, the subscriber mobile devices may communicate a second status to the responder server.

In some embodiments, the responder server includes a communications or command module configured to receive communications from the group of subscriber mobile devices. The responder server may also include a display and a processor configured to perform various functions in accordance with the following. For example, the responder server may be configured to define a geo-fence associated with location information received from the group of subscriber mobile devices. The responder server may display a map of a region associated with the defined geo-fence and display an icon on the map associated with each subscriber mobile device of the group of subscriber mobile devices that are located within the geo-fence. The responder server may be configured to change the color of the icon in response to a change in a status received from a respective subscriber device.

In some embodiments, the icon associated with each subscriber mobile device of the group of subscriber mobile devices is positioned on a map in a map location that corresponds to the location information. The map location may be updated based on an update of the location information. In some embodiments, the responder server is configured to receive an injury status from a subscriber mobile device of the group of subscriber mobile devices. A corresponding icon associated with the subscriber mobile device may change color in response to a change in the injury status.

In some embodiments, a subscriber mobile device of the group of subscriber mobile devices is configured to activate an onboard sensor of the subscriber mobile device. The responder server may be configured to receive data from a set of activated onboard sensors from a set of subscriber mobile devices of the group of subscriber mobile devices. The responder server may be configured to estimate a location of a threat based on the received data.

DETAILED DESCRIPTION

Figure 1:
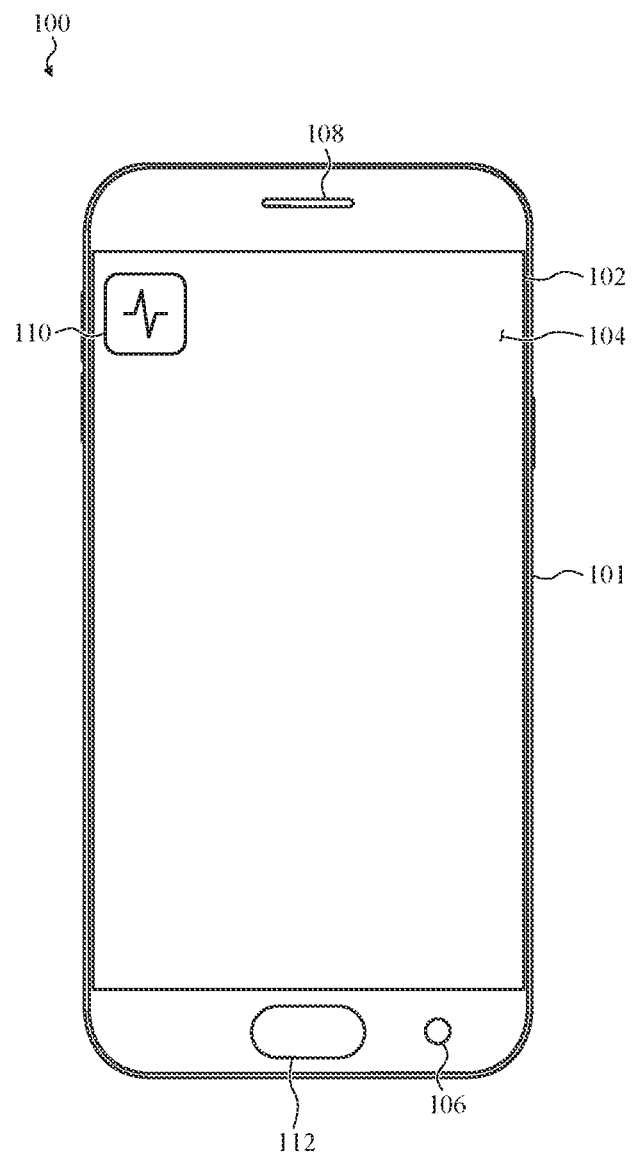
FIG. 1 depicts an example mobile device.

The following detailed description provides several example embodiments that are not intended to limit the claims to a single embodiment or implementation. The description is intended to describe example implementations and alternatives of the embodiments defined by the claims.

The following disclosure relates to devices and systems that are configured to facilitate communication between a user and a third party during an emergency situation. In particular, example devices are configured to facilitate communication using a specially configured user interface that provides clear visual cues and provides for simple, gesture-based user input. In some instances, the user interface is configured to suppress a response or reject/ignore user input that does not correspond to particular gesture-based input and may, therefore, prevent incidental or accidental communication between the user and a responder or emergency rescue personnel.

The user interface and systems described herein may be adapted for response to an emergency situation. Example emergency situations include active shooters, bomb threat, natural disaster, or other potentially life-threatening situations. In some cases, the user interface and systems described herein can be used to coordinate communications between users within a zone of danger and other parties that may be able to provide assistance. In some instances, the user interface and systems described herein can be used to identify and locate the threat and provide responders with more complete information about a developing or changing emergency situation.

In some cases, the user interface is implemented on a mobile device or other portable electronic device. The user interface may include a series of screens, displays, or user-interface panels, each screen or panel responsive to a gesture-based input. In response to receiving the correct gesture input, the user interface may cause the device to execute various functions in accordance with an emergency response procedure. Functions include transmission of an alert communication to an emergency responder service, transmission of the location of the user, transmission of regularly updated status communications indicating a propensity of a user to either move or remain in place, and transmission of an injury status. These and other transmissions may be received by a responder server that may coordinate information between the user and emergency responding personnel or authorities.

The responder server may serve as a centralized information communication point that coordinates information from a group of mobile devices that have subscribed or are running an application associated with the emergency responder services. These devices are referred to herein as "subscriber mobile devices." The responder server may define a geo-fence associated with a geographic location, which may include a public institution like a school, hospital, or other institution. The responder server may be used to identify subscriber mobile devices that are located within the geo-fence and display a map or other graphical interface indicating the relative position of each subscriber mobile device. The locations of each subscriber mobile device may be represented by an icon that may change color in response to a change in status of the associated user.

In some instances, the responder server may automatically activate the subscriber mobile devices that are located within the geo-fence. The activated devices may provide updated information to each user via a streaming message or dialogue window. The activated devices may also initiate or activate onboard sensors, such as microphones, cameras, or other acquisition devices that can be used to collect environmental data or information. Based on the collected data from mobile devices within the geo-fence, the responder server may estimate a location or region of potentially violent activity.

In some instances, the responder server may communicate with subscriber mobile devices that are within the geo-fence and relay information about the user's location with respect to an incident location or estimated location of a potential threat. The responder server may then communicate messages or other information with subscriber mobile devices that are within a specified region associated with the incident or potential threat. The responder server may also communicate messages or other information with subscriber mobile devices that are outside of the region associated with the incident but are associated with a common entity (e.g., company, university, or agency) or service administrator. For subscriber mobile devices that are outside of the region, the responder server may cause the application to be activated and display a user interface on respective subscriber mobile devices that provides information from the responder server and several options for the user to select to initiate further action.

These and other embodiments are discussed below with reference to FIGS. 1-11B. However, those skilled in the art will readily appreciate that the detailed description given herein with respect to these Figures is for explanatory purposes only and should not be construed as limiting.

FIG. 1 depicts an example mobile device. In particular, FIG. 1 depicts a device 100 that may be configured to provide one or more of the user interfaces in accordance with the embodiments provided herein. In this example, the device 100 is a mobile phone configured to provide telephone communications, data communications, and provide an advanced touch-based or gesture-based user interface also referred to as a smart phone. The following examples are provided with respect to device 100. However, the same techniques can also be applied to a variety of portable electronic devices, including tablet devices, notebook computing systems, portable media players, and the like.

As shown in FIG. 1, the device 100 includes a display 102 positioned within an enclosure 101. The device enclosure 101 or housing may be formed from a variety of rigid materials and structural elements configured to protect the internal components of the device 100. The display 102 may include one or more display elements including, for example, a liquid-crystal display (LCD) element, a light-emitting diode (LED) display element, an organic light-emitting display (OLED) element, and the like. In some cases the display 102 is configured to display aspects of a user interface including various interactive screens, displays, panels, or other forms of graphical user-interfaces, in accordance with the embodiments described herein.

As shown in FIG. 1, the device 100 also includes a touch sensor 104 that is integrated or incorporated with the display 102. The touch sensor 104 may include a capacitive array or other sensing element that is configured to detect the presence and location of a touch on the display 102. In some implementations, the touch sensor 104 is configured to detect the touch of a finger, stylus, or other object incident on a cover or other protective layer positioned over the display 102 and touch sensor 104. The touch sensor 104 may be configured to detect gesture input. Gesture input may be used to describe touch input that is based on more than simple touch presence and touch location. For example, a device that is configured to receive gesture input may be configured to detect one or more of: a duration of a touch, motion of a touch, a direction of motion of a touch, multiple touches, motion of multiple touches, direction of multiple touches, and other characteristics of one or more touches detected using the touch sensor. Example gesture input includes swipe gestures, pinch gestures, tap gestures, and so on.

The device 100 may also include a variety of other components including, for example, a speaker 108, a microphone 106, and one or more buttons 112. In accordance with some embodiments, the microphone 106 may be activated to collect ambient or environmental signals or audio input associated with the environment of the device 100. The device 100 may include other onboard sensors in addition to the microphone 106. Example onboard sensors include optical sensors, light sensors, pressure transducers, accelerometers, gyroscopes, magnetometers, altimeters, and so on. As described in more detail below with respect to FIG. 2, data collected using the various onboard sensors of the device 100 may be communicated to an external device, such as a responder server, which may use data from multiple devices to determine a location, monitor conditions, and/or locate potentially violent activity.

In some cases, the onboard sensors include a transmitter that is configured to emit an energy pulse or transmission including, for example, acoustic signals, radio signals, magnetic fields, and so on. An onboard receiver may be configured to detect reflections of the energy pulse or transmission, which may be used to locate objects in the proximity of the device 100. In some cases, the transmitter and receiver may be used to estimate a location of a device 100 or user within a building or partially enclosed space. For example, acoustic or radio energy signals may be transmitted by the device 100 and reflections of the transmitted signals may be used to help estimate a location of the device 100 within a building or enclosed structure. The transmitter/receiver sensor scheme may also be used in conjunction with another onboard sensor or sensors to improve the accuracy of the location estimate. In some cases, a layout or floorplan of the building is also used to improve the location estimate.

In another example, the onboard sensors include a magnetometer that is configured to detect a magnetic field. While the magnetometer may be generally configured to detect the location of the earth's natural magnetic field, the device 100 may be adapted to monitor changes in the reading of the magnetometer to determine a user's location within a building or enclosed structure. In some cases, metal or other materials within the building or enclosed structure may alter the earth's magnetic field, which may be detected using the magnetometer and used to more accurately predict where the user is located within a building or enclosed structure. For example, the magnetometer may be used to detect the presence and relative location of internal walls, which combined with additional data or information, may be used to locate the device 100 within a building or enclosed structure. For example, a building layout or floorplan may be used in combination with the magnetometer to determine the device's 100 (and the user's) location within the building or enclosed structure. The magnetometer may also be used in conjunction with one or more other sensors or devices to improve the location accuracy.

The device 100 may also include a global positioning system (GPS) or other location system that is configured to determine the location of the device 100 using a wireless communications network. In one example, the device 100 includes a wireless transceiver that is used to collect data from satellites, cellular stations, or other locating equipment that can be used to determine a current location of the device 100. The GPS may be used alone or in conjunction with one or more onboard sensors in order to estimate a location or track movement of the device 100.

The device 100 may also include other wireless communication systems including, for example, a WiFi wireless transceiver system. The wireless communication systems may enable data transmissions with a wireless computer network and connection to the Internet. In some instances, the wireless communication systems may also be configured to communicate with a wireless access point (WAP) using a beacon signal, which may be used to help locate the device within a building or enclosed space. The device 100 may also be configured to use geo-magnetic sensing techniques, described above, in combination with a WAP or WiFi signal to help locate the device within a building or enclosed space.

The device 100 may also include one or more processors and computer memory configured to store computer-readable instructions. The processors may include a central processing unit (CPU), programmable circuit, or other computer processing hardware. The processor(s) may be configured to execute the computer-readable instructions for performing one or more aspects of the user interface and device functionality described herein.

In the example of FIG. 1, the display 102 is used to display an icon 110 associated with a mobile software application or app. The icon 110 may be installed by the user or device administrator as part of an emergency preparedness plan or activity. The icon may be installed on a mobile device operating system or software platform. The device 100 may launch or execute the app when the icon 110 is selected using the touch sensor 104. The app associated with the icon 110 may display a series or screens, displays, or user-interface panels similar to those described below with respect to FIGS. 3-6, 9A-9C, and 11A-11B. While a single icon 110 is depicted in the example of FIG. 1, the device 100 may include multiple apps or software programs, each app configured to perform a different aspect of the systems described herein. Alternatively, a single app may be configured to operate in a manner consistent with all of the embodiments described herein and be configured to alternate between different modes of operation or operational states, as appropriate.

Figure 2:
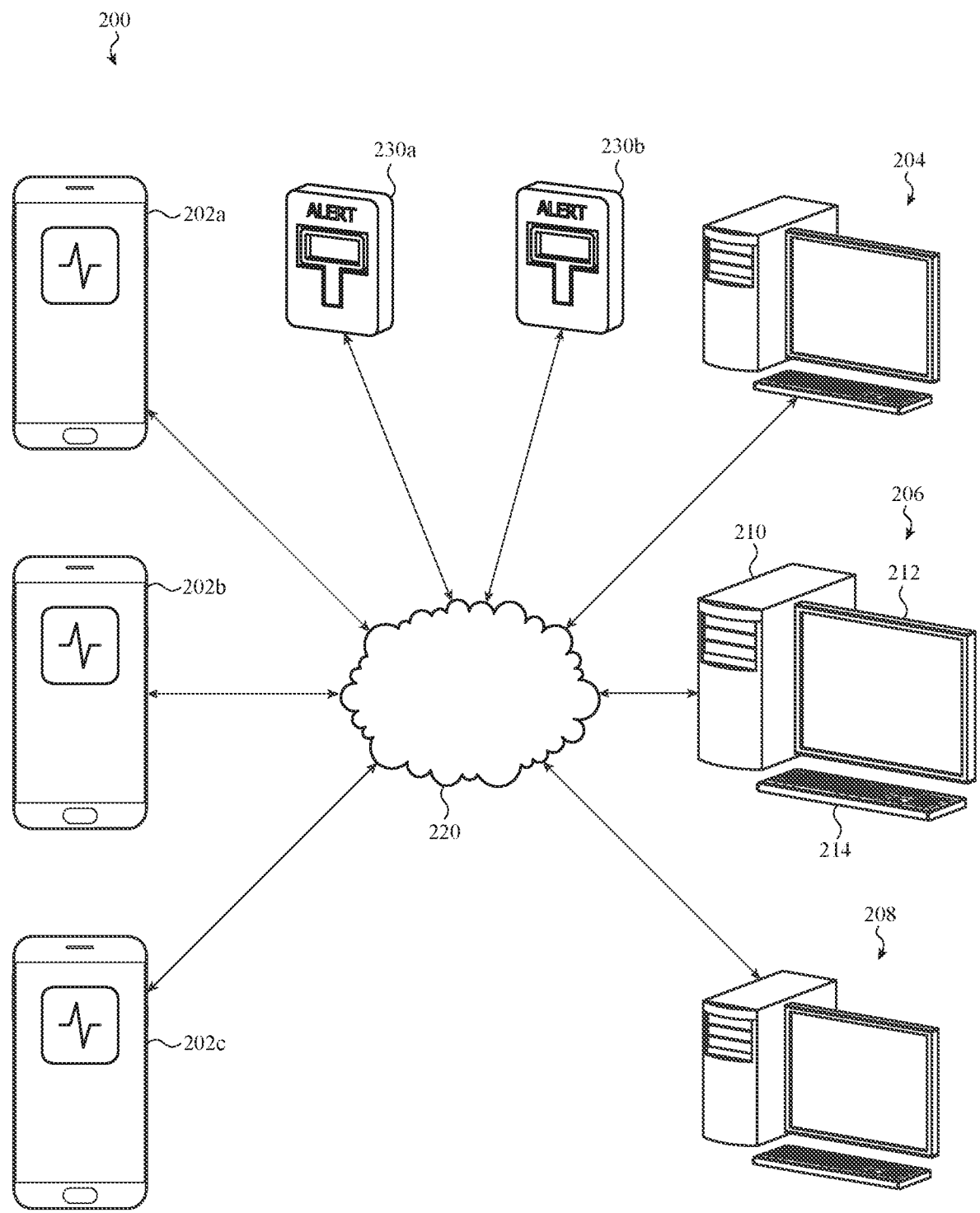
FIG. 2 depicts an example communications network including a device and example responder servers.

FIG. 2 depicts an example emergency communication system including an example (mobile) device and example responder servers. In particular, the emergency communication system 200 includes multiple subscriber mobile devices 202*a-c* in wireless communication with one or more responder servers 204, 206, 208 using network 220. The subscriber mobile devices 202*a-c* may correspond to the device 100 described above with respect to FIG. 1. In many cases, the emergency communication system 200 includes a large number of subscriber mobile devices that may include mobile phones, tablets, wearable devices, and the like, which are represented by subscriber mobile devices 202*a-c* as a simplified example. Each of the subscriber mobile devices 202*a-c* may be associated with a different user or subscriber.

The subscriber mobile devices 202*a-c* may be configured to transmit and receive data between one or more responder servers 204, 206, 208 using a communications network 220, such as a cellular or mobile device wireless communications network. In some cases, the subscriber mobile devices 202*a-c* are in communication with the one or more responder servers 204, 206, 208 via one or more cellular base stations, network communication servers, or other intermediate communications equipment. The subscriber mobile devices 202*a-c* may also be configured to send and receive telephone calls and other traditional data communications depending on the capabilities of the individual devices 202*a-c* and mobile service provider.

In accordance with the following embodiments, the emergency communication system 200 may be used to facilitate data transfer between the devices including, for example, location information of the subscriber mobile devices 202*a-c*, alert communications from the subscriber mobile devices 202*a-c*, update communications from the subscriber mobile devices 202*a-c*, and the like. The emergency communication system 200 may also facilitate the transmission of data that corresponds to the signals or information collected using the various onboard sensors of the subscriber mobile devices 202*a-c*. The emergency communication system 200 may also push notifications, messages, and other information from the responder servers 204, 206, 208 to the subscriber mobile devices 202*a-c*.

As shown in FIG. 2, each of the responder servers 204, 206, 208 may include a computer hardware module 210, a display 212, and a keyboard 214 or other user input device. The computer hardware module 210 may include one or more processors and computer memory configured to store computer-readable instructions. The computer-readable instructions may include instructions for performing one or more aspects of the responder servers 204, 206, 208 as described herein.

In some implementations, the responder servers 204, 206, 208 are configured to define or identify a geo-fence associated with a geographic location, which may include an entity like a school, hospital, company, agency or other organization having a geographic presence. The geo-fence may be predefined using geographic or other location-based information associated with a building or group of buildings associated with the organization. The geo-fence may be defined or created, for example, as part of an emergency preparedness plan or activity in conjunction with local authorities or emergency responders. The geo-fence may also include information about the floorplan or layout of the buildings, which may be used to locate subscriber mobile devices 202*a-c* within a building or structure.

Figure 7:
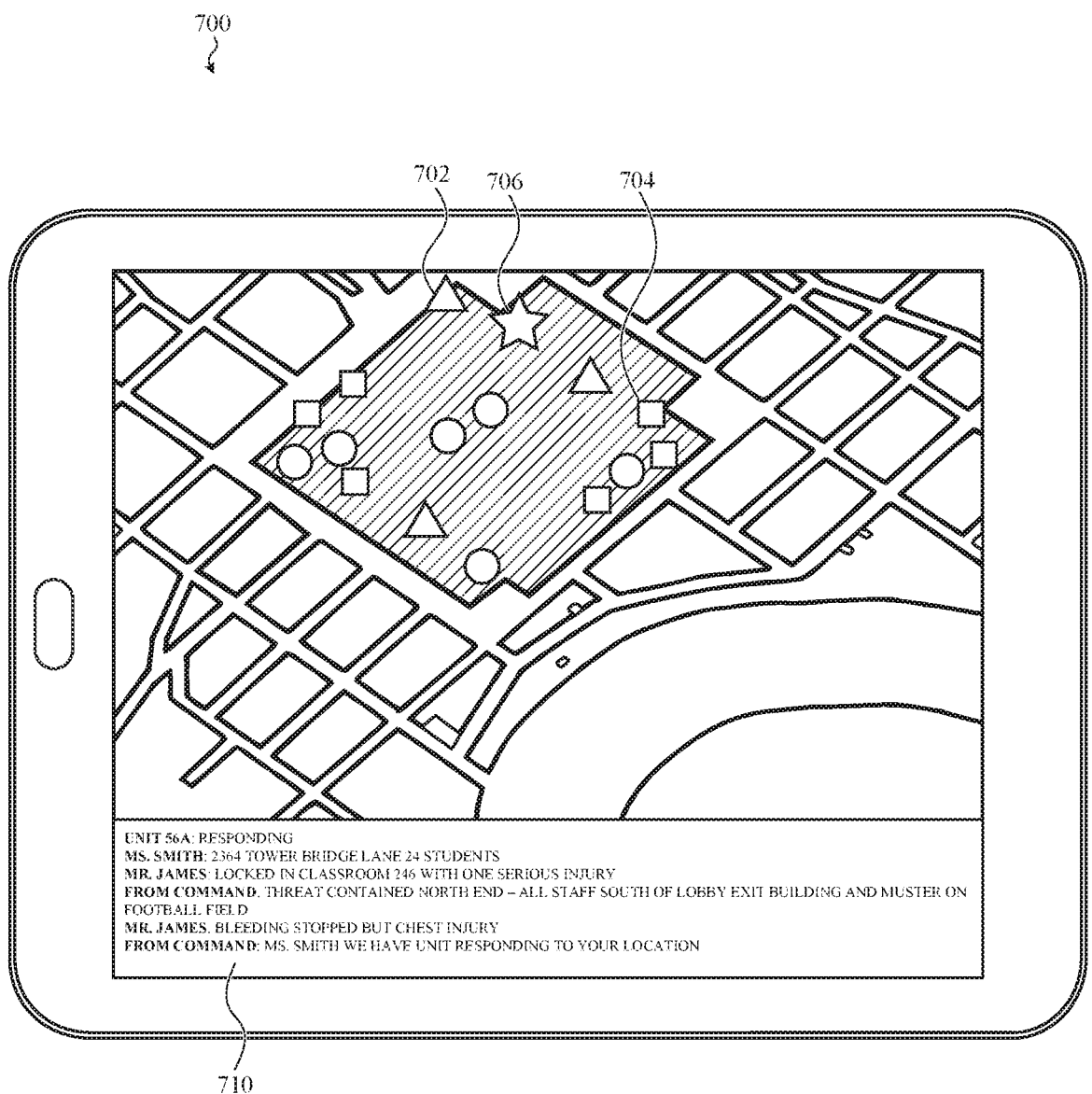
FIG. 7 depicts an example map of a region associated with a geo-fence.

As discussed previously, one or more of the responder servers 204, 206, 208 may be configured to determine if one or more of the subscriber mobile devices 202*a-c* is located within the geo-fence. The responder servers 204, 206, 208 may also use the display 212 to display a map or other graphical interface indicating the relative position of each of the subscriber mobile devices 202*a-c* located within the geo-fence. The locations of each subscriber mobile device may be represented by an icon that may change color in response to a change in status of the associated user. In some cases, the responder servers 204, 206, 208 are configured to receive an injury status from any one of the subscriber mobile devices 202*a-c*. A corresponding icon associated with the subscriber mobile device may change color or change some other visual aspect in response to a change in the injury status. An example map is depicted in FIG. 7, described below.

As shown in FIG. 2, emergency communication system 200 may include other types of devices for providing input to the responder servers 204, 206, 208. The other devices may include a dedicated alarm pull device 230 that is installed in a building or facility. The dedicated alarm pull device 230 may resemble a fire alarm or other emergency alert device, but may be designated with an "Active Threat," "Alert," or other similar text instead of the traditional "Fire" designation. The alarm pull device 230 may include a pull handle, button, or other user input device that is used to trigger an alert communication or other signal to the responder servers 204, 206, 208. The alarm pull device 230 may be configured to communicate with the network 220 directly using a wired or wireless communication protocol. The alarm pull device 230 may also be configured to communicate with the network 220 via one or more intermediate devices or relay systems.

In some instances, one or more of the responder servers 204, 206, 208 may automatically activate the subscriber mobile devices 202*a-c* that are located within the geo-fence. The activated devices may provide updated information to each user via a streaming message or dialogue window. Example user interfaces depicting non-limiting example messaging information are provided below with respect to FIGS. 5, 9A-9C, and 11A-11B. The activated devices may also initiate or activate onboard sensors, such as microphones, cameras, or other acquisition devices that can be used to collect environmental data or information. Based on the collected data from activated devices within the geo-fence, the responder servers 204, 206, 208 may estimate a location or region of potentially violent activity.

In some implementations, one or more of the responder servers 204, 206, 208 may be configured to estimate the location or region of the potentially violent activity based on acoustic or pressure wave signals gathered by one or more subscriber mobile devices 202*a-c*. For example, a responder server (204, 206, 208) may be configured to identify or estimate the location of an event such as a gunshot or explosion. A gunshot or explosion may produce a shock wave, an acoustic signal, and/or a flash of light. Any one or a combination of which can be detected using the onboard sensors of the subscriber mobile devices 202*a-c*.

In one example, a responder server (204, 206, 208) may be configured to measure a time differential between an impulse or acoustic signal or shock wave received by two or more devices. Based on the location of the respective devices and the time differential between the received signals, the responder server (204, 206, 208) may be able to triangulate the location of the source of the loud event. Alternative techniques may be also be used. For example, the relative intensity of two or more signals may be compared and used to estimate a distance from the event (e.g., the gunshot or explosion). In some cases, an optical sensor (e.g., the camera or light sensor) of the device may be used to measure an amount of emitted light due to the event. The light and, in particular, relative differences between received light from multiple devices may be used to estimate the location or occurrence of the event. In some cases, signals received from the onboard sensors may be used to determine a type of event (e.g., gunshot or explosion) and the source of the event (e.g., type of firearm or type of explosive). Information about the event may be used to update or track the location of potentially violent activity over time.

In some embodiments, each of the responder servers 204, 206, 208 is associated with a different authority or responding organization. For example, responder server 206 may be associated with an emergency medical service or hospital, responder server 208 may be associated with a police or law enforcement agency, and responder server 204 may be associated with an emergency responder service, private institution, or organization having authority to manage emergency communications.

FIGS. 3-6 depict a first set of example screens, displays, or user-interface panels in accordance with some embodiments. The screens or displays of FIGS. 3-6 depict selected aspects of an example gesture-based user interface that may be adapted for use in emergency situations. FIGS. 3-6 are provided by way of example only and aspects of the user interface described below may vary or depart from the examples depending on the implementation.

Figure 3:
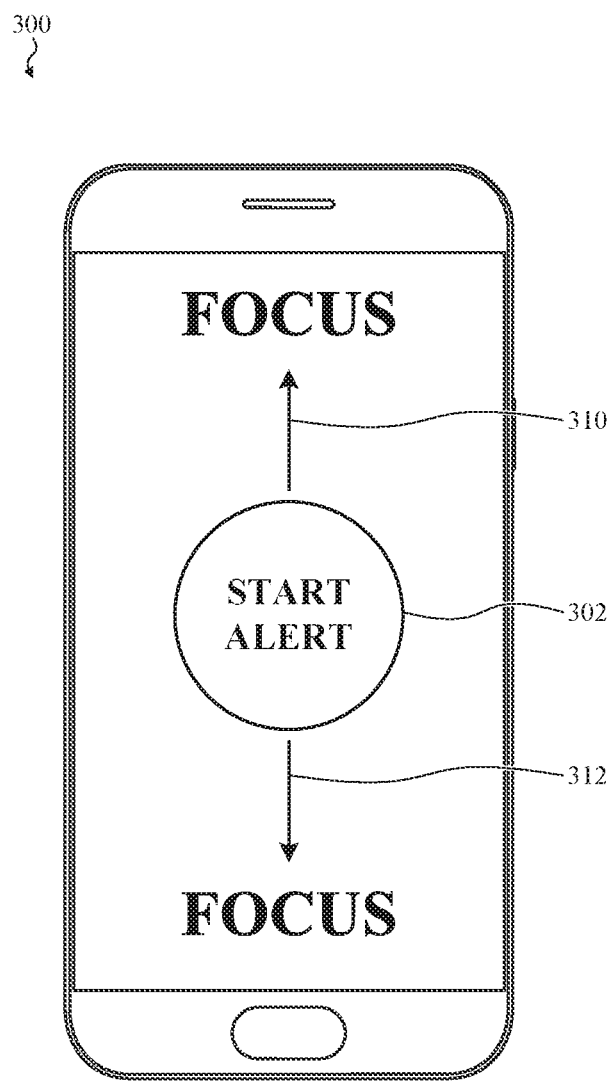
FIG. 3 depicts an example user interface for a device configured to initiate an alert.

FIG. 3 depicts an example user interface for a device configured to initiate an alert. In particular, FIG. 3 depicts display 300, which includes an initiate-alert region 302. The display 300 may be the initial or one of the initial screens displayed when the application is launched or initiated. Display 300 may allow the user to initiate an alert communication with a responder server. The initiation of an alert communication may be performed in response to a threat or potentially violent activity sensed or otherwise perceived by the user.

As shown in FIG. 3, the initiate-alert region 302 includes a graphical icon. In particular, the graphical icon includes a geometric shape and a brief instruction or other text indicating the action to be performed. Here, the icon includes the text "start alert" indicating that the user may initiate an alert using the user interface.

Figure 4A:
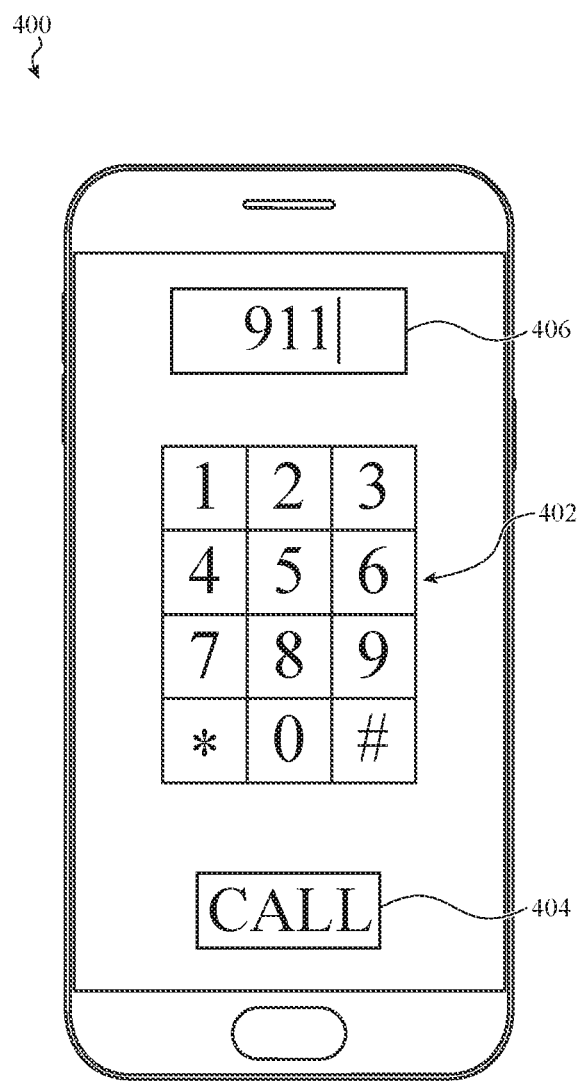
FIG. 4A depicts an example user interface for a device configured to initiate an alert communication using an alert communication interface.

In this example, the user may perform a pre-defined gesture on the display 300 in order to initiate an alert communication and/or an alert communication interface (e.g., as shown in FIG. 4A). The alert communication may be transmitted to a responder server or directly to an emergency responder service, such as 9-1-1, local police department, or other similar emergency service. In some cases, the alert communication is transmitted automatically (e.g., without additional user input or with a user confirmation) or, alternatively, the alert communication may be performed at the direction of the user.

In some cases, the alert communication includes location information that is also transmitted to a responder server and may be based on information determined using a global positioning system or other device-enabled location system or location-determining technique. The location information may be relayed by the response server and/or used to generate a map of device locations (see, e.g., map 700 of FIG. 7).

The predefined gesture may be both simple enough to perform under duress and also not easily mistaken for an accidental or incidental touch on the touch sensor of the device. For example, the predefined gesture may include a swipe-gesture input over the initiate-alert region 302. In some cases, the predefined gesture includes a vertical upward swipe indicated by arrow 310 on FIG. 3. The predefined gesture may also include a vertical downward swipe indicated by arrow 312 on FIG. 3.

The device may be configured to suppress a response or ignore/reject user input that does not correspond to the predefined gesture. For example, touch input other than a vertical swipe gesture may not initiate an alert communication that is transmitted to the responder server. Additionally, a vertical swipe that is not long enough or does not pass over a predefined region (e.g., the initiate-alert region 302) may not initiate an alert communication.

In some embodiments, the device is configured to only initiate an alert if the device is located within a predefined geo-fence. This may also prevent inadvertent or accidental alert initiation by the user. By way of example, the device may be configured to determine a location of the device and determine if the location is within a predefined geo-fence. In accordance with a determination that the location is within the geo-fence, the device may be configured to initiate the alert communication in response to receiving the predetermined gesture. In accordance with a determination that the location is not within the geo-fence, the device may prohibit or suppress an initiation of the alert communication in response to receiving the predetermined gesture.

FIG. 4A depicts an example user interface for a device configured to operate an emergency alert interface that can be used to communicate an emergency alert. In particular, FIG. 4A depicts a user-interface display 400 that may be used to initiate, confirm or otherwise facilitate a telephone call to an emergency responder service (e.g., 9-1-1). In the present example, the user-interface display 400 includes a number pad 402 that may be used to dial or enter a telephone number. The user-interface display 400 also includes a number display region 406 that may display the telephone number being entered using, for example, the number pad 402. In some instances, the number display region 406 displays a predetermined telephone number (e.g., 9-1-1) that is automatically entered when the emergency alert interface is initiated. The user-interface display 400 also includes a button 404, which may be used to confirm or initiate the call with the phone number displayed in the number display region 406.

The user-interface display 400 may be initiated automatically in response to the user performing a predetermined gesture on, for example the initiate-alert region 302 depicted in FIG. 3. When the user-interface display 400 is initiated, the telephone number may be automatically populated in the number display region 406. The user may then initiate a call by simply pressing the button 404. The call may be facilitated by one or more responder servers (described above with respect to FIG. 2) or, alternatively, may be conducted using a traditional mobile telephone communication network.

Figure 4B:
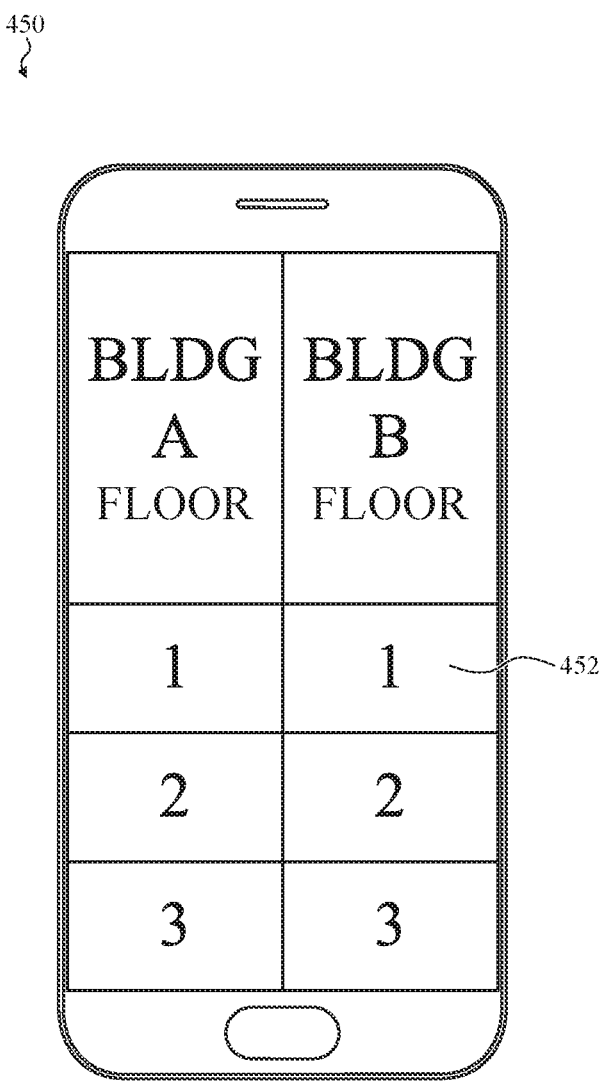
FIG. 4B depicts an example user interface for a device configured to receive location information from the user.

FIG. 4B depicts an example user interface for a device configured to receive location information from the user. In some embodiments, the device may be configured to display a user-interface display 450 including a number pad 452. In response to receiving touch input on the number pad 452 on a particular floor number, the device may communicate the floor number to the responder server. In some cases, the range of floor numbers is limited using the location information (obtained using the global positioning system), which may include altitude information that corresponds to a range of potential floors on which the user may be located. In some implementations, the user may be able to select from additional predetermined location options to help determine and track the location of the user and device within the building or enclosed structure. The floor or other information entered by the user may be combined with a floorplan or building layout in addition with one or more location tracking techniques (e.g., GPS, transmitter/receiver sensing, geo-magnetic sensing, wireless access point) to determine and track the location of the user and device.

Figure 5:
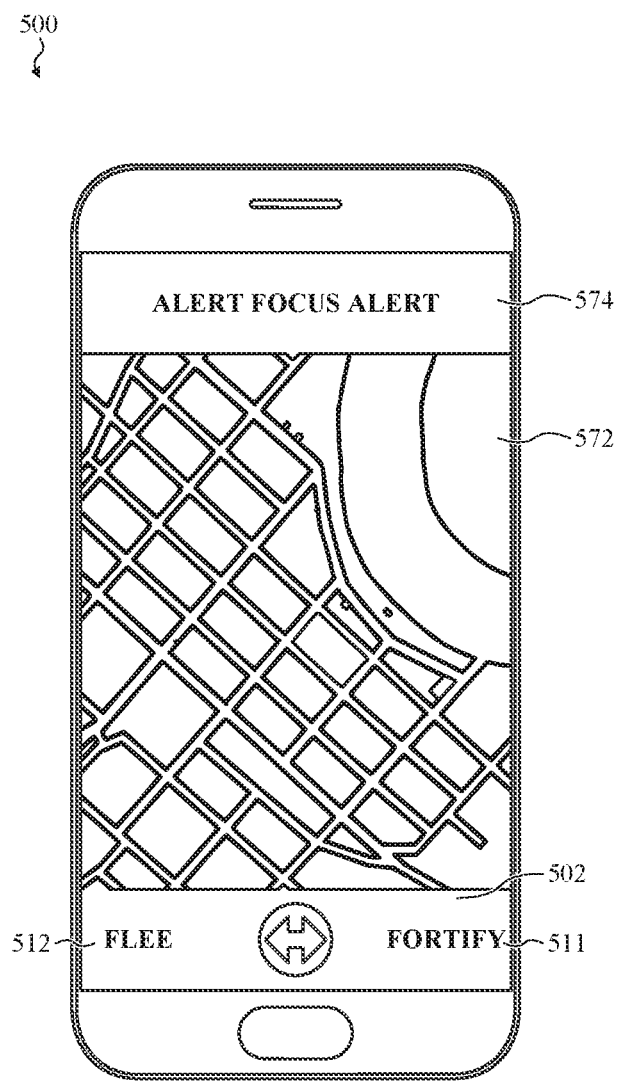
FIG. 5 depicts an example user interface for a device configured to relay location or mobility information.

FIG. 5 depicts an example user interface for a device configured to relay location and mobility information. In particular, FIG. 5 includes a display 500 having a bifurcated status region 502, a map 572, and an information region 574. In some implementations, the display 500 may include a bifurcated status region 502 and no map 572 and/or no information region 574. The display 500 may be displayed in response to the user initiating an alert in accordance with the example of FIG. 3.

Similar to the example provided above, the display 500 is configured to receive a predetermined gesture in order to transmit or communicate information to the responder server. By using a gesture-based input, accidental or unintentional input may be ignored while also providing a user interface that can be navigated by a user under duress.

In particular, the use of a bifurcated status region 502 may facilitate clear options that can be selected by the user by performing one of two predefined gestures. The bifurcated status region 502, as implemented in the user interface, is configured such that the device will perform one of two options depending on the type of gesture that is performed over the bifurcated status region 502. In some cases, the user interface will suppress a response or ignore user input that does not correspond to one of two predefined gestures.

In the present example, the bifurcated status region 502 includes two areas or ends that indicate a first status 511 and a second status 512. The first status 511 may be "fortify" or "stay" indicating that a user intends to remain in one location. The second status 512 may be to "flee" or "move" indicating that a user intends to change location. By performing a first gesture over the bifurcated status region 502, the device may initiate a status communication associated with the first status 511. The first gesture may be a horizontal swipe that is performed in a direction toward the first end or first area associated with the first status 511. Similarly, by performing a different, second gesture over the bifurcated status region 502, the device may initiate a status communication associated with the second status 512. The second gesture may be a horizontal swipe that is performed in a direction toward the second end or second area associated with the second status 512.

Similar to the previous example, the device may suppress a response or ignore any touch input that does not correspond to one of the two predefined gestures. For example, if the device receives any user input other than a horizontal swipe in either of the above-mentioned directions, the user input may be ignored or a communication with the responder server suppressed.

FIG. 5 also includes other information that may be communicated to the user. For example, the display 500 includes a map 572, which may correspond to a portion of the geo-fence occupied by or surrounding the device 100. The map 572 may be updated in accordance with a change of location of the device. The map may also indicate information including escape routes or first aid stations or locations of other types of assistance. As shown in FIG. 5, an information region 574 may be used to communicate a simple message to the user. For example, the information region 574 may be used to display a scrolling message "alert," "focus," "alert."

Figure 6:
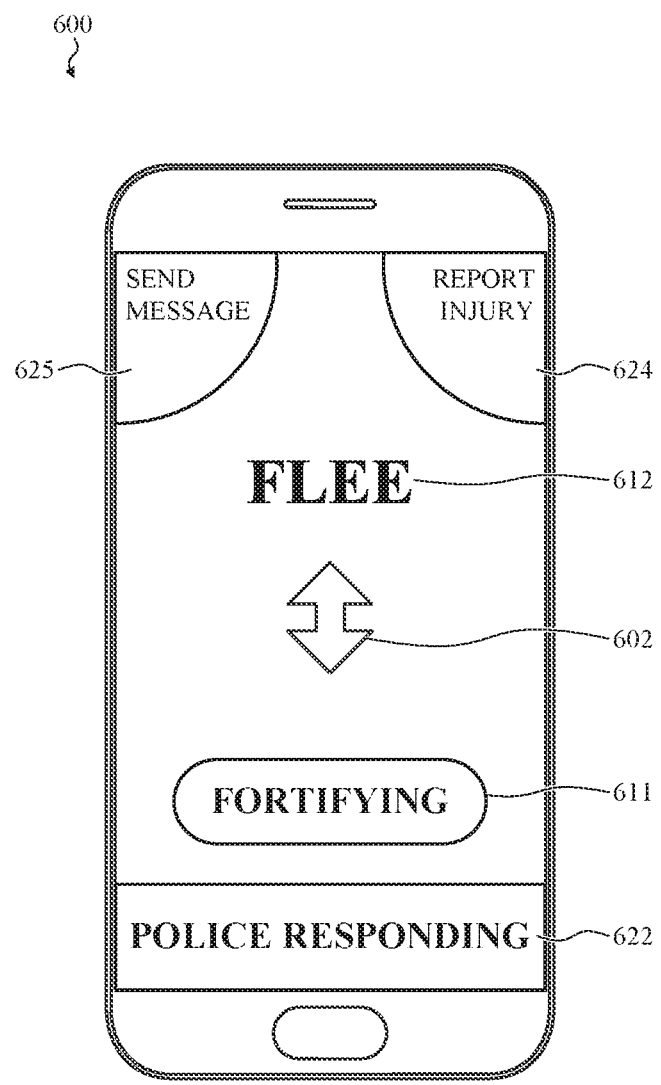
FIG. 6 depicts an example user interface for a device configured to relay a change in location or mobility information.

FIG. 6 depicts an example user interface for a device configured to relay a change in location or mobility information. In particular, FIG. 6 depicts a display 600 that is configured to receive additional gesture-based user input. The display 600 may be presented in response to the user selecting the "fortify" or "stay" user option in accordance with the example provided above with respect to FIG. 5. In the event that the user selected the "flee" or "move" user option, a similar but different display would be presented having the flee and fortifying options reversed to those shown in FIG. 6.

Similar to the previous examples, the display 600 may be configured to accept pre-defined gesture input and ignore or reject other touch input in order to prevent inadvertent or accidental communications. The display 600 is also configured to present simple and clear options for the user to update his or her location or mobility information.

In the example of FIG. 6, the display 600 may include an update status region 602. The update status region 602 may include the first user status option in a first area 611 and the second user status option in a second area 612. In response to a first predefined gesture, the device may initiate an updated status communication associated with the first user status option. For example, a vertical swipe-gesture input directed toward the first area 611 may result in an updated status communication that indicates that the user intends to fortify or stay in the same location. In response to a second predefined gesture, the device may initiate an updated status communication associated with the second user status option. For example, a vertical swipe-gesture input directed toward or across the second area 612 may result in an updated status communication that indicates that the user intends to flee or move from his or her current location.

As shown in FIG. 6, one of the two options may be to maintain a current or previous status. In the present example, the previous status was "fortify" or "stay" as indicated with a maintain current status icon displayed in the first area 611. A change status icon is displayed in the second area 612, which in this case corresponds to a changed status of "flee" or "move."

As shown in FIG. 6, the display 600 may include other information and be configured to receive other non-gesture based input. For example, the display 600 includes a message region 622 that includes an updated message transmitted from the responder server. The display 600 also includes an injury icon 624. In response to receiving a touch input on the injury icon 624, the device may initiate an injury report communication to the responder server. Similarly, a message communication may be initiated in response to receiving touch input on the message icon 625.

FIG. 7 depicts an example map of a region associated with a geo-fence as displayed on a responder server. As discussed previously, the responder server may be configured to determine if a subscriber mobile device is located within a predefined geo-fence. FIG. 7 depicts an example map 700 indicating the relative position of each subscriber mobile device located within the geo-fence. The locations of each subscriber mobile device may be represented by an icon 702, 704 having a map location that corresponds to the location of the subscriber mobile device. The estimated location of a potential threat or potentially violent activity may be represented by icon 706. The estimated location of the potential threat or potentially violent activity may be determined using one or more sensors (located within the subscriber mobile devices or within the building) or may be determined based on input from the users or other persons witnessing activity within the building.

In some embodiments, the colors of the icons 702, 704 may change color in response to a change in status of the associated user. For purposes of illustration, the icons depicted in FIG. 7 having different colors are represented by different shapes (e.g., squares, circles, stars). Depending on the implementation, the icons may be color-coded, shape-coded, color- and shape-coded, or otherwise visually distinguished from each other.

The visual coding may be used to provide a simple overview of the status of the various users within the geo-fence. For example, the responder server may receive an indication of the user's mobility (e.g., that the user intends to remain in one place or move). In accordance with a change in the status of the user's mobility, the color/shape of the corresponding icon 702, 704 may change. Similarly, the responder server may receive an update regarding an injury status of the user, and a change in injury status may also be indicated by a change in color/shape of the corresponding icon 702, 704.

As shown in FIG. 7, the responder server user interface may also include a message dialogue region 710 located adjacent to the map 700. The message dialogue region 710 may be used to type messages to be transmitted to the various subscriber mobile devices. The message dialogue region 710 may also display messages received from the subscriber mobile devices and/or other entities. In some cases, the message dialogue region 710 displays messages received from law enforcement or other emergency response personnel.

FIGS. 8-11B depict example systems and user interfaces for a distributed alert system in accordance with some embodiments. The distributed alert systems of the following examples may be implemented using the device hardware and systems described above with respect to FIGS. 1 and 2. In some implementations, the distributed alert systems are implemented using a different app or software program installed on a subscriber mobile device. Alternatively, the functionality of the distributed alert systems may be integrated or incorporated with the example system described above with respect to FIGS. 3-7.

Figure 8:
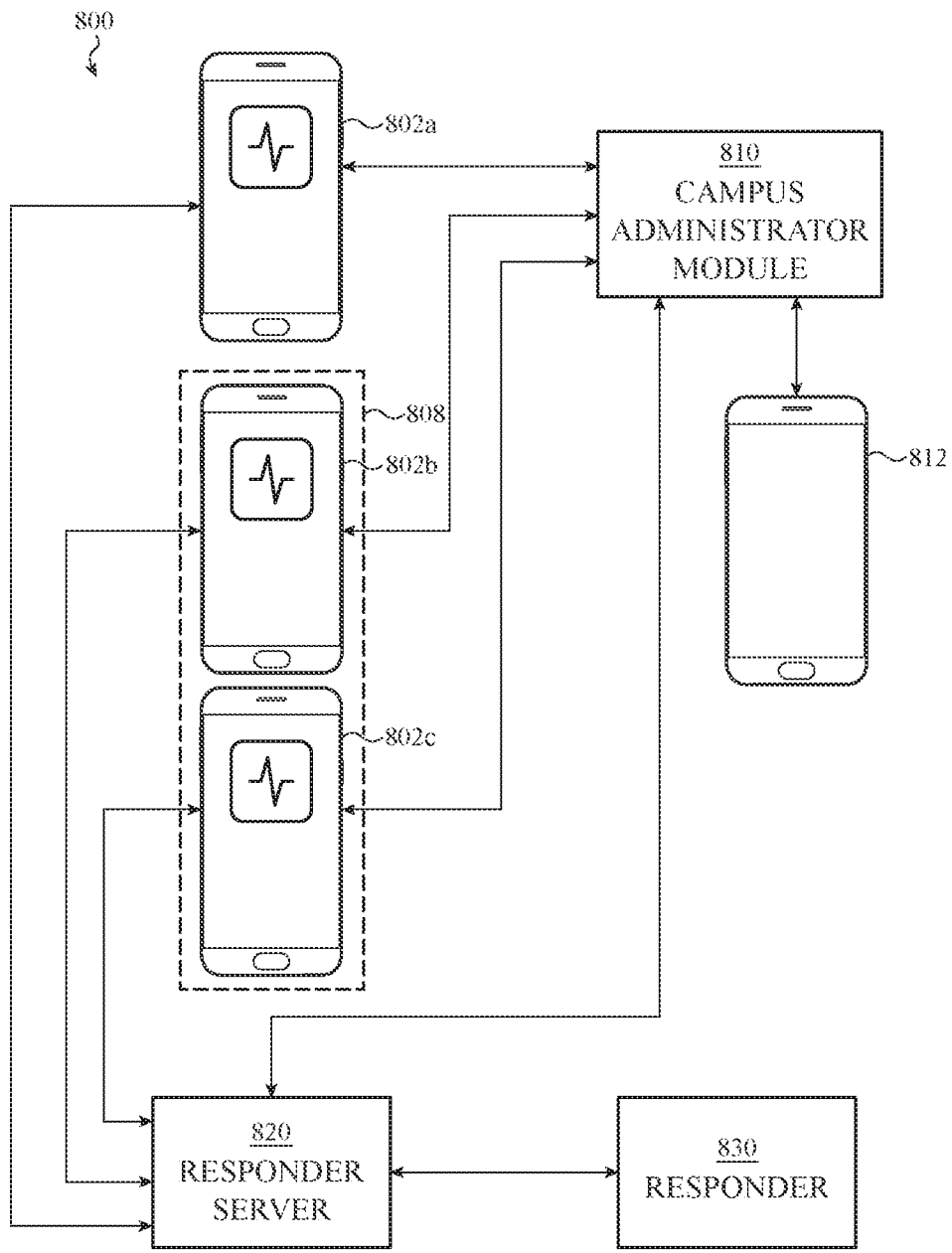
FIG. 8 depicts an example system for a first type of distributed alert system.

FIG. 8 depicts an example system for a first type of distributed alert system. In particular, FIG. 8 depicts a distributed alert system 800 that may be implemented on a university, campus, or other organization that includes multiple buildings or a variety of locations. In some instances, the distributed alert system 800 may be a simplified notification system that is configured to operate independent of the functionality described above with respect to FIGS. 3-7.

The distributed alert system 800 may include a set of subscriber mobile devices 802a-802c having an app or software program installed for providing the functionality and user interfaces described herein. The subscriber mobile devices 802a-802c may be the personal mobile phones or personal computing devices owned by the students, employees, or other members of an organization. The subscriber mobile devices 802a-802c may be configured to communicate, using the app or software program, with a campus administrator module 810 and a responder server 820. Similar to the examples provided above with respect to FIG. 2, the subscriber mobile devices 802a-802c may be configured to perform wireless communication with the responder server 820 and the campus administrator module 810 using a wireless or cellular communication network.

In the present example, the campus administrator module 810 may include a server having a corresponding app or software program configured to facilitate the communications in accordance with the distributed alert system 800. The campus administrator module 810 may be operated by the university, school, employer, or other administrator of an organization. Access to the campus administrator module 810 may be restricted and/or monitored to reduce the incidence of false alarms or incorrect information being propagated through the distributed alert system 800. In some cases, aspects of the campus administrator module 810 may be controlled by a mobile or personal electronic device 812 operated by an authorized user.

As shown in FIG. 8, the distributed alert system 800 also includes a responder server 820, which may be implemented on a server system consistent with the embodiments described above with respect to FIG. 2. In particular, the responder server 820 may be configured to define or identify a geo-fence or region associated with a geographic organization. The geo-fence or region may correspond to a building or group of buildings associated with a campus or organization. The geo-fence or region may also correspond to a region surrounding a location of an incident or activity. The responder server 820 may also include information about the floorplan or layout of individual buildings, which may be used to locate subscriber mobile devices 802a-802c within a particular building or structure.

A single responder server 820 may be used to communicate with multiple organizations, each having a campus administrator module or similar server. The responder server 820 may also be configured to facilitate communication to an external entity like a responder 830, which may include a local fire department, police department, emergency medical service, or other type of responder organization. In some cases, the responder 830 is an emergency responder service associated with an emergency telephone number like 9-1-1.

In some embodiments, the distributed alert system 800 is configured to relay location information and key updates to the subscriber mobile devices 802a-802c associated with the campus, business, or organization. The distributed alert system 800 may be configured to provide essential information in an emergency situation and provide users a single or consolidated access point for communicating with authorities or responders. The distributed alert system 800 may also be configured to collect key information from users, which may facilitate an emergency response effort.

In an example implementation, the distributed alert system 800 may be implemented on a school or university campus. The subscriber mobile devices 802a-802c may be operated by students, teachers, or employees of the school or university in accordance with an emergency preparedness plan and configured to alert the appropriate users of a potential threat or incident. The campus administrator module 810 may be operated by or through a campus police department or security group that is associated with the school or university.

In one example, an alert communication may be initiated by the school or university using the campus administrator module 810. The alert communication may be associated with an incident location, which is an estimated location of a threat or potentially violent activity. In some cases, the campus administrator module 810, alone or in conjunction with the responder server 820, may be configured to identify a set of users that is located within a region 808 proximate to the incident location. The set of users within the region 808 may, for example, include students and teachers in a building in which the incident location has been identified. The alert communication may initiate or launch the app on software program on each subscriber mobile device 802b-802c within the region 808. The alert communication may include basic information about the type of alert and initial instructions like evacuate or remain in place. The alert communication may also include location information about incident location. Example user interfaces or screens displayed during an emergency alert are described below with respect to FIGS. 9A-9C.

After initiating the alert, the subscriber mobile devices 802b-802c may communicate with a responder server 820 either directly or through the campus administrator module 810. Information about the location of the subscriber mobile devices 802b-802c or data collected from the subscriber mobile devices 802b-802c may be related or sent directly to the responder server 820. Some or all of this information may be relayed to the responder 830 and used to provide emergency assistance.

The campus administrator module 810 may also be configured to transmit messages or an alert communications to other subscriber mobile devices 802a that fall outside of the region 808. The alert communications sent to the other subscriber mobile devices 802a may be different than the alert communications sent to the subscriber mobile devices 802b-802c located within the region 808. For example, the alert communications transmitted to the other subscriber mobile devices 802a may omit incident location information or may provide different instructions or guidance.

Figure 9A:
FIGS. 9A-9C depict an example user interface for a first type of distributed alert system.
Figure 9B:
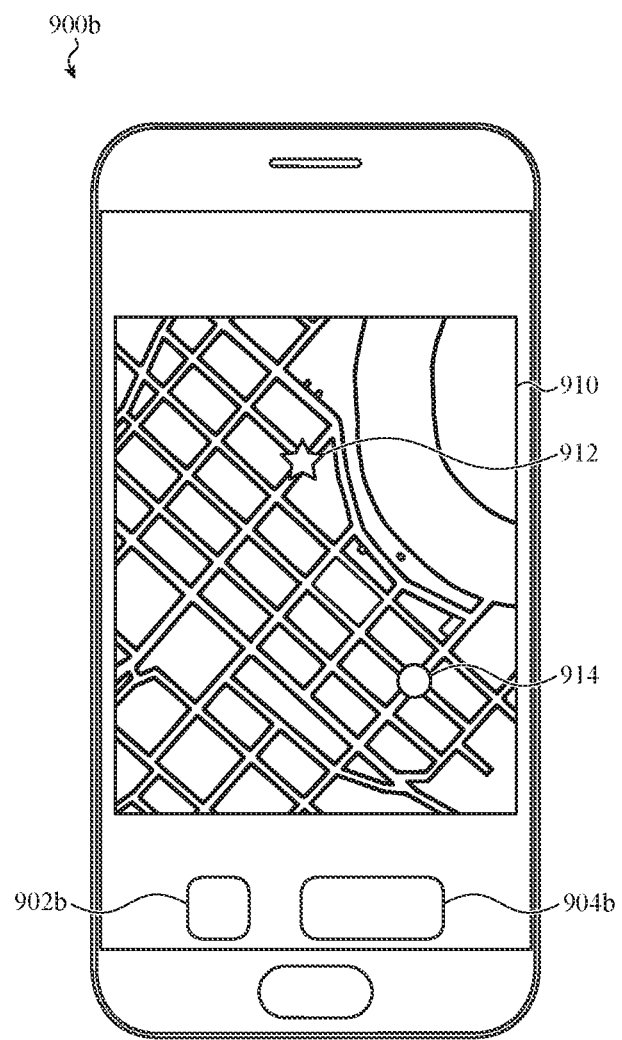
Figure 9C:
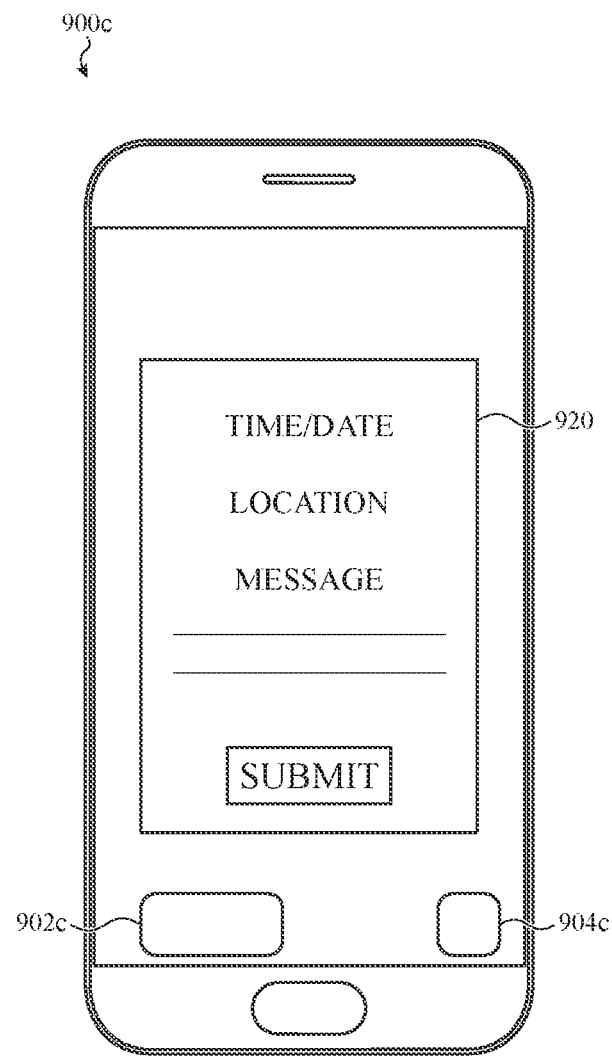

FIGS. 9A-9C depict example user interfaces for a first type of distributed alert system. FIGS. 9A-9C may be displayed, for example, in response to an alert communication transmitted by a campus administrator module (e.g., module 810 of FIG. 8). As mentioned previously, an initial alert communication may launch the app or software program on selected subscriber mobile devices that are associated with a particular location or region.

FIG. 9A depicts an example screen, display, or user interface that may correspond to a home screen once an alert communication has been received. In particular, display 900a includes an initial message or communication and may also include a graphical element or symbol. The message or communication may include instructions or guidance for handling an emergency situation. The message or communication may be updated as subsequent alert messages are received by the device.

As shown in FIG. 9A, the display 900a also includes various selectable options or virtual button objects that may be used to trigger other functionality. In one example, a first button 902a may trigger a telephone call to authorities. For example, the button 902a may initiate a 9-1-1 call, which may be facilitated through the user's cellular communication network or through communication with a responder server, in accordance with some embodiments. A second button 904a may be used to acknowledge the receipt of the communication. The acknowledgement may be transmitted to either or both the campus administrator module or a responder server. In some instances, the second button 904a may initiate a map display (e.g., map display 900b of FIG. 9B). The display 900a may also include a third button 906a that initiates a report display (e.g., report display 900c of FIG. 9C) used to provide information about an event or incident. Depending on the implementation, additional buttons or functionality may also be included in display 900a.

FIG. 9B depicts a map display 900b for providing location information to a user. In the present example, the map display 900b includes an image or graphical representation of a map 910 that may correspond to a user's location or building. The map 910 may be updated in accordance with a change of location of the device. The map 910 may also indicate information including escape routes or first aid stations or locations of other types of assistance. The map 910 may also include an icon 912 that represents an incident location, which may have been transmitted to the device by a campus administrator module or a responder server. The map 910 may also include an icon 914 that corresponds to the current location of the device and user. The map display 900b may be useful in navigating away from a threat or planning a course of action.

As shown in FIG. 9B, the map display 900b may also include a first button 902b that may trigger a telephone call to authorities. For example, the first button 902b may initiate a 9-1-1 call similar to the example described above. The map display 900b may also include a second button 904b, which may return the user to a display showing incoming messages, similar to the display 900a described above with respect to FIG. 9A.

FIG. 9C depicts a report display 900c that may be used to provide information about an event or incident. The report display 900c may be used to provide anonymous tips regarding suspicious occurrences or persons to authorities or a campus resource. As shown in FIG. 9C, the report may have a window 920 that includes a time, date, and location associated with the report. The window 920 may also provide a field or the ability to record a message about the incident or event. In some cases, a soft keyboard may be used to enter text or the user may record a message using the microphone of the device. The user may submit the report either anonymously or with personal information about the user. The information associated with the report may be transmitted to authorities via a responder server and/or to a campus resource through a campus administrator module.

As shown in FIG. 9C, the display 900c also includes a first button 902c that may be used to initiate a telephone call to authorities. For example, the first button 902c may initiate a 9-1-1 call similar to the examples described above. The report display 900c may also include a second button 904c, which may return the user to a display showing incoming messages, similar to the display 900a described above with respect to FIG. 9A.

Figure 10:
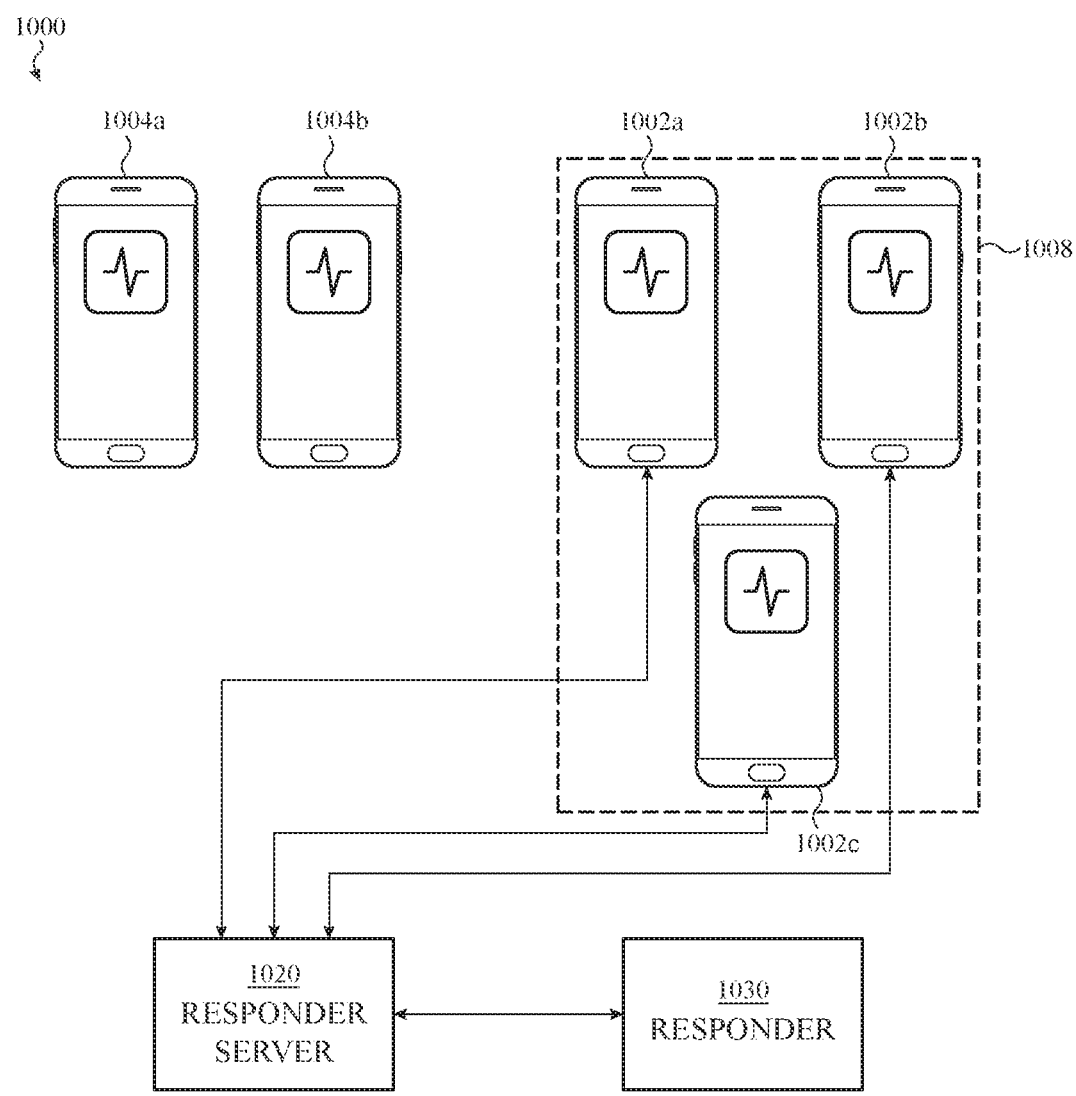
FIG. 10 depicts an example system for a second type of distributed alert system.

FIG. 10 depicts an example system for a second type of distributed alert system. In particular, FIG. 10 depicts a distributed alert system 1000 that may be implemented across a range of locations for users that are associated with one or more organizations that are equipped to implement the distributed alert system 1000. In some instances, the distributed alert system 1000 may be simplified notification system that is configured to operate independent of the functionality described above with respect to FIGS. 3-7.

The distributed alert system 1000 may include a set of subscriber mobile devices 1002a-1002c and 1004a-1004b having an app or software program installed for providing the functionality and user interfaces described herein. The subscriber mobile devices 1002a-1002c and 1004a-1004b may be the personal mobile phones or personal computing devices owned by respective users. The subscriber mobile devices 1002a-1002c and 1004a-1004b may be configured to communicate, using the app or software program, with a responder server 820 similar to the other examples provided above.

As shown in FIG. 10, the distributed alert system 1000 includes a responder server 1020, which may be implemented on a server system consistent with the embodiments described above with respect to FIG. 2. In particular, the responder server 1020 may be configured to define or identify a geo-fence or region associated with a geographic organization. The geo-fence or region may correspond to a building or group of buildings associated with a particular organization. The geo-fence or region may also correspond to a region surrounding a location of an incident or activity. The responder server 1020 may also include information about the floorplan or layout of individual buildings, which may be used to locate subscriber mobile devices 1002a-1002c within a particular building or structure.

Similar to other examples, a single responder server 1020 may be used to communicate with multiple organizations, each having a campus administrator module or similar server. The responder server 1020 may also be configured to facilitate communication to an external entity like a responder 1030, which may include a local fire department, police department, emergency medical service, or other type of responder organization. In some cases, the responder 1030 is an emergency responder service associated with an emergency telephone number like 9-1-1.

In some embodiments, the distributed alert system 1000 is configured to relay location information and key updates to both a first group of subscriber mobile devices 1002a-1002c associated with a location or region 1008 and a second group of subscriber mobile devices 1004a-1004b outside of the location or region 1008. The distributed alert system 1000 may be configured to provide essential information in an emergency situation and provide users a single or consolidated access point for communicating with authorities or responders. The distributed alert system 1000 may also be configured to collect key information from users, which may facilitate an emergency response effort.

In an example implementation, the distributed alert system 1000 may be implemented over a wide region such as a town or portion of a metropolitan area and configured to coordinate with users that are within a geo-fence of a company or organization that is able to facilitate communications through the distributed alert system 1000. In some cases, the company or organization is a subscriber to a related emergency preparedness service.

In one example, an alert communication may be initiated by the responder server 1020. The alert communication may be initiated in response to a report provided by a mobile subscriber device, a police call, or other type of initiating event. In some cases, the alert communication is associated with an incident location, which is an estimated location of a threat or potentially violent activity. In some cases, the responder server 820, may be configured to identify a set of users that is located within a region 1008 proximate to the incident location. The set of users having mobile subscriber devices 1002a-1002c within the region 1008 may, for example, include those users located within in a building or region in which the incident location has been identified. The alert communication may initiate or launch the app or software program on each subscriber mobile device 1002a-1002c within the region 1008. The alert communication may include basic information about the type of alert and initial instructions like evacuate or remain in place. The alert communication may also include location information about incident location. Example user interfaces or screens displayed during an emergency alert are described below with respect to FIGS. 11A-11B.

After initiating the alert, the subscriber mobile devices 1002a-1002c may communicate with the responder server 1020 either directly or through an intermediate server or module. Information about the location of the subscriber mobile devices 1002a-1002c or data collected from the subscriber mobile devices 1002a-1002c may be related or sent directly to the responder server 1020. Some or all of this information may be related to the responder 1030 and used to provide emergency assistance.

The responder server 1020 may also be configured to transmit global messages or alert communications to other subscriber mobile devices 1004a-1004b that fall outside of the region 1008. The alert communications sent to the other subscriber mobile devices 1004a-1004b may be different than the alert communications sent to the subscriber mobile devices 1002a-1002c located within the region 1008. For example, the alert communications transmitted to the other subscriber mobile devices 1004a-1004b may omit incident location information or may provide different instructions or guidance.

Figure 11A:
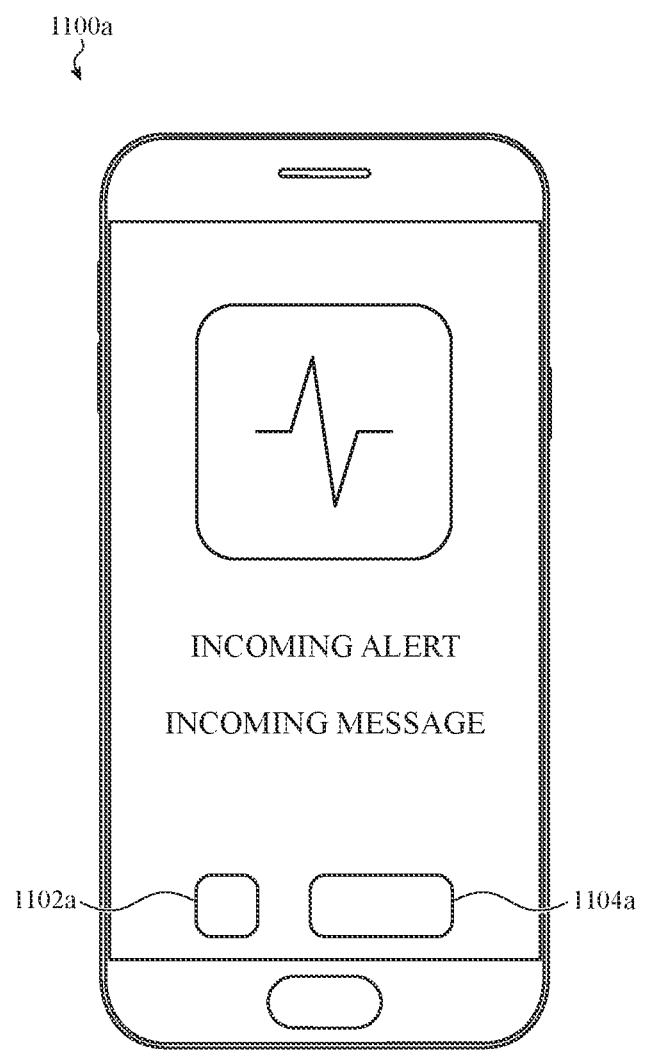
FIGS. 11A-11B depict an example user interface for the second type of distributed alert system.
Figure 11B:
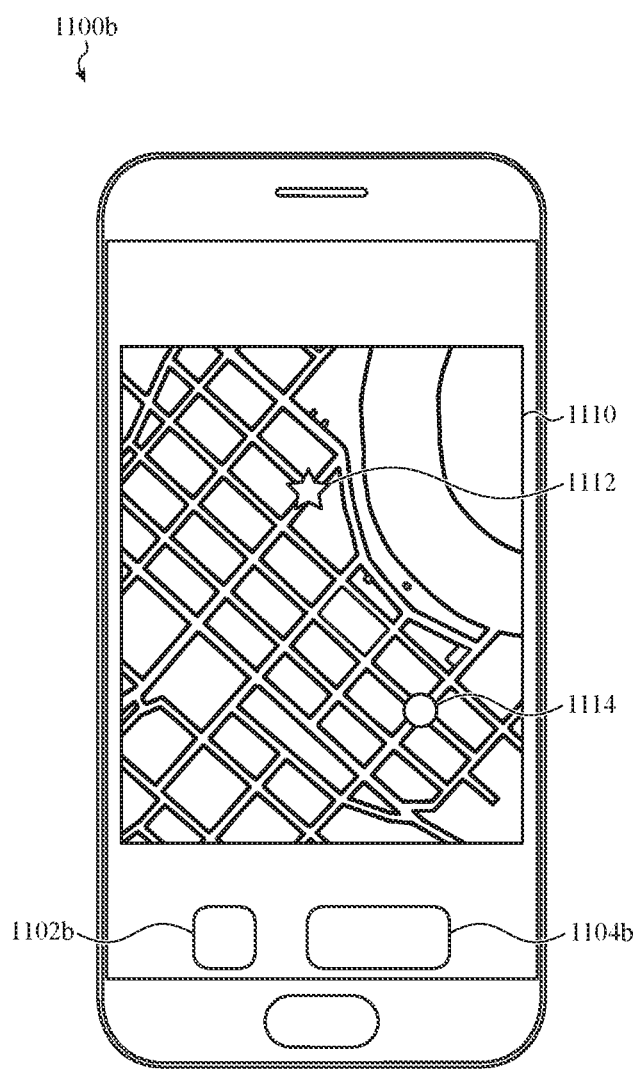

FIGS. 11A-11B depict example user interfaces for a second type of distributed alert system. FIGS. 11A-11B may be displayed, for example, in response to an alert communication transmitted by a server (e.g., responder server 1020 of FIG. 10). As mentioned previously, an initial alert communication may launch the app or software program on selected subscriber mobile devices that are associated with a particular location or region.

FIG. 11A depicts an example screen, display, or user interface that may correspond to a home screen once an alert communication has been received. In particular, display 1100a includes an initial message or communication and may also include a graphical element or symbol. The message or communication may include instructions or guidance for handling an emergency situation. The message or communication may be updated as subsequent alert messages are received by the device.

As shown in FIG. 11A, the display 1100a also includes various selectable options or virtual button objects that may be used to trigger other functionality. In one example, a first button 1102a may trigger a telephone call to authorities. For example, the button 1102a may initiate a 9-1-1 call, which may be facilitated through the user's cellular communication network or through communication with a responder server, in accordance with some embodiments. A second button 1104a may be used to acknowledge the receipt of the communication. The acknowledgement may be transmitted to a responder server or other server or station. In some instances, the second button 1104a may initiate a map display (e.g., map display 1100b of FIG. 11B).

FIG. 11B depicts a map display 1100b for providing location information to a user. In the present example, the map display 1100b includes an image or graphical representation of a map 1110 that may correspond to a user's location or building. Similar to the previous example, the map 1110 may be updated in accordance with a change of location of the device. The map 1110 may also indicate information including escape routes or first aid stations or locations of other types of assistance. The map 1100 may also include an icon 1112 that represents an incident location, which may have been transmitted to the device by the responder server. The map 1110 may also include an icon 1114 that corresponds to the current location of the device and user. The map display 1100b may be useful in navigating away from a threat or planning a course of action.

As shown in FIG. 11B, the map display 1100b may also include a first button 1102b that may trigger a telephone call to authorities. For example, the button 1102b may initiate a 9-1-1 call similar to the example described above. The map display 1100b may also include a second button 1104b, which may return the user to a display showing incoming messages, similar to the display 1100a described above with respect to FIG. 11A.

The screens, displays, and user interfaces are provided by way of example and are not intended to be an exhaustive demonstration of functionality or limiting in nature. The description provided above is provided by way of explanation of the embodiments of this disclosure. The particular details of any one example or set of examples may not be required in order to implement the ideas contained within the disclosure. The examples are provided as illustrations of various implementations and are not intended to be exhaustive or limit the claims to a single example embodiment. One of ordinary skill in the art would understand that certain modifications and variations are possible and that such modifications and variations may be within the scope of the claims.

What is claimed is:

1. A mobile device comprising:
   a display; and
   a touch sensor incorporated with the display and configured to detect gesture input;
   wherein the mobile device is configured to:
      launch a mobile software application in response to a user input;
      display an initiate-alert region of the mobile software application on the display;
      determine a device location of the mobile device;
      determine if the device location is within a predefined geo-fence;
      in accordance with a first determination that the device location is within the geo-fence and in response to receiving a first gesture input while the initiate-alert region is displayed, initiate an alert communication interface;
      in accordance with a second determination that the device location is not within the geo-fence, prohibit or suppress initiation of the alert communication interface; and
      in response to initiating the alert communication interface:
         display a bifurcated status region of the mobile software application on the display, the bifurcated status region having two ends including a first end indicating a first user status option and a second end indicating a second user status option;
         in response to receiving a second gesture input that includes a first swipe gesture in a first direction toward the first end of the bifurcated status region, transmit a status communication associated with the first user status option thereby indicating that a user intends to stay at the device location;
         in response to transmitting the status communication associated with the first user status option, cause a display of an icon on a map displayed on a separate device, the icon having a first visual coding indicating that the user intends to stay at the device location;
         in response to receiving a third gesture input that includes a second swipe gesture in a second direction that is opposite to the first direction, transmit a status communication associated with the second user status option thereby indicating that the user intends to move from the device location; and
         in response to transmitting the status communication associated with the second user status option, cause the display of the icon on the map displayed on the separate device, the icon having a second visual coding indicating that the user intends to move from the device location.

2. The mobile device of claim 1, wherein:
   the first gesture input is a vertical swipe gesture over the initiate-alert region;
   touch input other than the vertical swipe gesture does not initiate the alert communication interface;
   the second gesture input is a first horizontal swipe gesture toward the first end of the bifurcated status region;
   the third gesture input is a second horizontal swipe gesture toward the second end of the bifurcated status region; and
   touch input other than the first or second horizontal swipe gesture in the bifurcated status region does not initiate a status communication with either the first or second user status options.

3. The mobile device of claim 1, wherein the alert communication interface includes a user interface for making a telephone call to 9-1-1.

4. A mobile device comprising:
   a global positioning system configured to determine location information using a wireless communication network;
   a display for displaying a user interface of a mobile software application;
   a touch sensor incorporated with the display and configured to detect touch input for the user interface;
   internal memory configured to store computer-readable instructions; and
   a processor configured to execute the computer-readable instructions, the instructions for:
      initiating the mobile software application;
      displaying an initiate-alert icon of the mobile software application on the display;
      determining a device location from the location information;
      determining if the device location is within a predefined geo-fence;
      in accordance with a first determination that the device location is within the geo-fence and in response to receiving a gesture input over the initiate-alert icon, initiating an alert communication interface;
      in accordance with a second determination that the device location is not within the geo-fence, prohibiting or suppressing initiation of the alert communication interface; and
      in response to initiating the alert communication interface:
         broadcasting the location information to a responder server;
         displaying a bifurcated status region of the mobile software application on the display, the bifurcated status region indicating a first user status option at a first end and a second user status option at a second end;
         in response to receiving a first swipe-gesture input directed in a first direction toward the first end, causing a transmission of a first status communication associated with the first user status option indicating that a user intends to stay at the device location;
         in response to receiving the first swipe-gesture input, cause a display of an icon on a map displayed on a separate device, the icon having a first visual coding indicating that the user intends to stay at the device location;
         in response to receiving a second swipe-gesture input directed in a second direction, opposite to the first direction and toward the second end, causing a transmission of a second status communication associated with the second user status option indicating that the user intends to move from the device location; and in response to receiving the second swipe-gesture input, cause a display of the icon on the map displayed on the separate device, the icon having a second visual coding indicating that the user intends to move from the device location.

5. The mobile device of claim 4, wherein the instructions further comprise instructions for:

displaying an update status region on the display, the update status region including the first user status option in a first area and the second user status option in a second area;

in response to an additional swipe-gesture input being directed toward the first area, causing a transmission of an updated status communication associated with the first user status option; and in response to the additional swipe-gesture input being directed across the second area, causing a transmission of an updated status communication associated with the second user status option.

6. The mobile device of claim 4, wherein the instructions further comprise instructions for:

determining a current user status;

displaying a maintain current status icon in a first region using the display;

displaying a change status icon in a second region using the display;

in response to a third swipe-gesture input over the first region, causing a transmission of a maintain status communication; and in response to a fourth swipe-gesture input toward the second region, causing a transmission of a change status communication.

7. The mobile device of claim 4, wherein the instructions further comprise instructions for:

displaying an injury icon on the display; and in response to receiving a touch input on the injury icon, initiating an injury report communication to the responder server.

8. The mobile device of claim 4, wherein the instructions further comprise instructions for:

defining the geo-fence based on the location information obtained using the global positioning system; and displaying a map associated with the geo-fence adjacent to the bifurcated status region.

9. The mobile device of claim 4, wherein the instructions further comprise instructions for:

displaying an update status region on the display; and displaying a scrolling message in a region adjacent to the update status region.

10. The mobile device of claim 9, wherein the scrolling message includes instructions for the user.

11. The mobile device of claim 4, wherein the alert communication interface is operable to contact an emergency responder service.

12. A portable electronic device comprising:

a display having a touch sensor configured to detect gesture input; and a memory configured to store computer-readable instructions, wherein the portable electronic device is configured to execute the computer-readable instructions for:

executing a mobile software application on the portable electronic device;

displaying an initiate-alert region of the mobile software application on the display;

determining location information related to the portable electronic device;

determining, from the location information, if the portable electronic device is within a predefined geo-fence;

in accordance with a first determination that the portable electronic device is within the geo-fence and in response to receiving a gesture input while the initiate-alert region is displayed, initiating an alert communication interface;

in accordance with a second determination that the portable electronic device is not within the geo-fence, prohibiting or suppressing initiation of the alert communication interface; and in response to initiating the alert communication interface:

transmitting an alert communication;

broadcasting the location information to a responder server;

displaying a bifurcated status region of the mobile software application on the display, the bifurcated status region indicating a first user status option at a first end and indicating that a user intends to remain at a location corresponding to the location information and a second user status option at a second end and indicating that the user intends to move from the location corresponding to the location information;

in response to receiving a first swipe-gesture input in a first direction toward the first end of the bifurcated status region, causing a transmission of a status communication associated with the first user status option;

in response to transmitting the status communication associated with the first user status option, cause a map to display an icon having a first visual coding on a separate device, the first visual coding indicating that the user intends to stay at the location corresponding to the location information;

in response to receiving a second swipe-gesture input in a second direction that is opposite to the first direction and toward the second end of the bifurcated status region, causing a transmission of a status communication associated with the second user status option; and in response to transmitting the status communication associated with the second user status option, cause the map to display the icon having a second visual coding, the second visual coding indicating that the user intends to move from the location corresponding to the location information.

13. The portable electronic device of claim 12, wherein the portable electronic device is configured to:

display a first user interface screen in response to receiving the first swipe-gesture input in the first direction; and display a second user interface screen in response to receiving the second swipe-gesture input in the second direction.

14. The portable electronic device of claim 12, wherein the portable electronic device is further configured to:

display a number pad on the display;

receive a touch input on the number pad indicating a floor number of a building; and communicate the floor number to the responder server in response to the touch input.

15. An emergency communication system comprising:
a group of subscriber mobile devices configured to communicate using a wireless network, each subscriber mobile device comprising:
  a global positioning system configured to determine location information;
  a touch-sensitive display; and
  a first processor configured to:
    execute a mobile software application;
    determine if a device location of the subscriber mobile device is within a geo-fence using the location information;
    in accordance with a first determination that the device location is within the geo-fence, initiate an alert communication interface;
    in response to initiating the alert communication interface:
      communicate the location information to a responder server in response to an initiated alert produced using the mobile software application receiving a gesture input on the touch-sensitive display;
      display a bifurcated status region of the mobile software application on the touch-sensitive display, the bifurcated status region having a first end and a second end;
      in response to receiving a first swipe-based gesture over the bifurcated status region in a first direction toward the first end of the bifurcated status region, communicating a first status to the responder server thereby indicating that a user intends to stay at the device location; and
      in response to receiving a second swipe-based gesture over the bifurcated status region in a second direction opposite to the first direction and toward the second end of the bifurcated status region, communicating a second status to the responder server thereby indicating the user intends to move from the device location; and
    in accordance with a second determination that the device location is not within the geo-fence, prohibit or suppress the initiation of the alert communication interface;
the responder server comprising:
  a command module configured to receive communications from the group of subscriber mobile devices;
  a display; and
  a second processor configured to:
    define the geo-fence associated with location information received from the group of subscriber mobile devices;
    display a map of a region associated with the geo-fence; and
    display an icon on the map associated with each of the group of subscriber mobile devices that is located within the geo-fence the icon positioned within the map in accordance with the location information and having a visual coding, the visual coding being determined in accordance with the subscriber mobile device receiving the first swipe-based gesture indicating that the user intends to remain at the device location or receiving the second swipe-based gesture indicating that the user intends to move from the device location.

16. The emergency communication system of claim 15, wherein:
the icon associated with each of the group of subscriber mobile devices is positioned on the map in a map location that corresponds to the location information; and
the map location is updated based on an update of the location information.

17. The emergency communication system of claim 15, wherein:
the responder server is configured to receive an injury status from a subscriber mobile device of the group of subscriber mobile devices; and
a corresponding icon associated with the subscriber mobile device changes color in response to a change in the injury status.

18. The emergency communication system of claim 15, wherein:
a subscriber mobile device of the group of subscriber mobile devices is configured to activate an onboard sensor of the subscriber mobile device.

19. The emergency communication system of claim 18, wherein:
the responder server is configured to receive data from a set of activated onboard sensors from a set of subscriber mobile devices of the group of subscriber mobile devices; and
the responder server is configured to estimate a location of a threat based on the received data.

* * * * *